(12) United States Patent
Chiu (10) Patent No.: US 7,468,684 B2
(45) Date of Patent: Dec. 23, 2008

(54) CONTENT INTEGRATION PLATFORM WITH FORMAT AND PROTOCOL CONVERSION

(75) Inventor: Fu-Sheng Chiu, Taipei (TW)

(73) Assignee: Era Digital Media Co., Ltd., Taipei (TW)

( * ) Notice: Subject to any disclaimer, the term of this patent is extended or adjusted under 35 U.S.C. 154(b) by 279 days.

(21) Appl. No.: 11/172,843

(22) Filed: Jul. 5, 2005

(65) Prior Publication Data

US 2007/0011182 A1   Jan. 11, 2007

(51) Int. Cl.
    *H03M 7/34*   (2006.01)
(52) U.S. Cl. .............................. 341/51; 341/50; 348/722
(58) Field of Classification Search ................... 341/50, 341/51; 725/86, 63, 143, 146, 112; 348/722
    See application file for complete search history.

(56) References Cited

U.S. PATENT DOCUMENTS

| 6,362,856 | B1 * | 3/2002 | Guzik et al. ................ 348/722 |
| 2004/0255327 | A1 * | 12/2004 | Scheelke ..................... 725/86 |
| 2005/0028225 | A1 * | 2/2005 | Dawson et al. .............. 725/146 |

* cited by examiner

*Primary Examiner*—Jean B Jeanglaude
(74) *Attorney, Agent, or Firm*—Rosenberg, Klein & Lee (57) ABSTRACT

An interactive multimedia device that converts media content in real-time or near-real-time from a variety of input data formats to data formats accepted by a user's available output devices, and to output protocols that can communicate with the user's devices. The multimedia device can acquire content from remote sources and deliver it to the user. The multimedia device further supports interactive use and the generation of content by the user, as well as the purchase of media content on demand.

18 Claims, 12 Drawing Sheets

CONTENT INTEGRATION PLATFORM WITH FORMAT AND PROTOCOL CONVERSION

BACKGROUND OF THE INVENTION

1. Field of the Invention

The present invention relates to a multimedia system. More specifically, the present invention discloses an interactive multimedia content integration platform that converts among a wide variety of input and output formats and protocols.

2. Description of the Prior Art

Traditionally, media devices have been designed around one or two formats. Consumers could purchase a television set and an AM/FM radio. These devices allowed consumers to watch broadcast television or to listen to broadcast radio.

Figure 1:
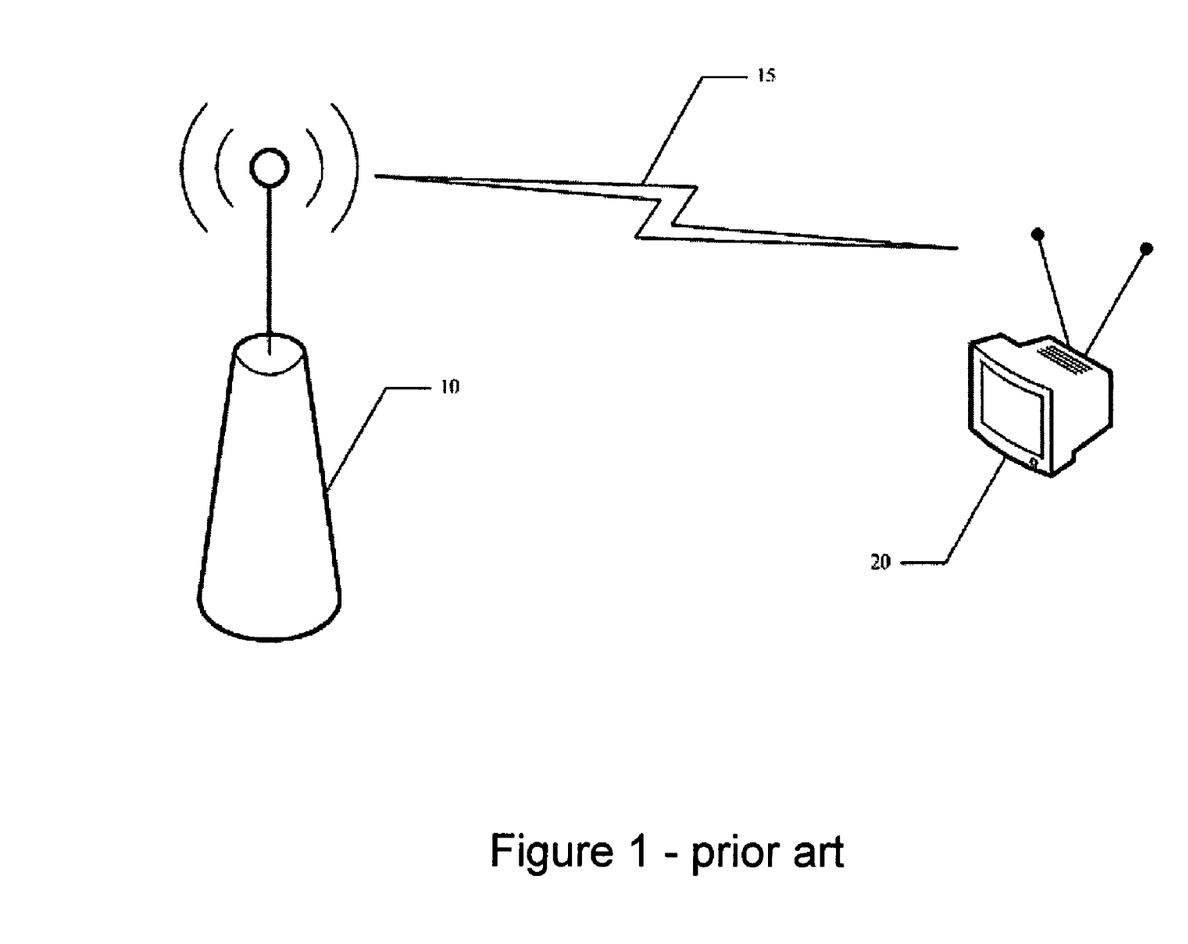
FIG. 1 is an illustration of a conventional television delivery system.

Refer to FIG. 1, which is an illustration of a conventional media delivery system. A television station creates media content and utilizes a transmitter 10 to transmit a signal 15 to a user's television 20 on which a user can view the media content.

However, these systems only provide the ability to send information from the producer to the consumer; there is no way for a media consumer to interact with the content or to send information to the media producer. Only a few limited formats and protocols are supported, and only media content which originates in the format used by a given device can be played on that device; televisions can not tune in FM radio stations, nor can an AM/FM radio tune in the audio of a television broadcast. The media consumer is limited to watching or listening when the media producer is broadcasting a given item of media content; if the media consumer is busy, the media consumer would be unable to access the media content. Additionally, new content formats and protocols can not be added to these legacy devices, stifling innovation. Moreover, media producers either have to create content in all available formats, or have to limit the formats they used, thereby also limiting their market.

Therefore there is need for a multimedia system that can interconvert formats and protocols, freeing media producers from having to create content in many different formats, allowing the opportunity to develop new formats and protocols, letting media consumers access content on a variety of different devices, and facilitating communication between media producers and consumers.

SUMMARY OF THE INVENTION

To achieve these and other advantages and in order to overcome the disadvantages of the conventional method in accordance with the purpose of the invention as embodied and broadly described herein, the present invention provides a multimedia content integration platform with interactive communication between media producer and media consumer.

Available sources for media entertainment include multiple satellite systems, cable systems, streaming audio and video over internet sources in multiple formats, DVD and VCD, streaming and downloadable formats from a variety of vendors, and dozens of smaller distinct codecs (encoder/decoder formats). Media content can be delivered over internet protocols such as IP and Wi-Fi, cellphone protocols such as 3G and CDMA, broadcast video standards, and so on. This diversification of formats and protocols is driven by a variety of technical, marketing, security, ownership, and political concerns. On the receiving end, consumers no longer want to be limited to watching broadcast television on a dedicated television; consumers want to be able to access media content on demand from any location, whether they are using a cellphone with a color LCD screen, a laptop in an internet cafe with a wireless network, or even an old television set. On the consumer's side, the device that the consumer may have available at any given moment may need to access the desired media content in a different format from that in which the content has been made available.

The present invention provides a multimedia system which converts among a wide variety of formats and communications protocols, thereby allowing media content to be accessed on a wide variety of devices.

The present invention further provides a multimedia system that is upgradeable so that the system will be able to utilize new formats and protocols as they are developed.

Additionally, the present invention provides integration of various types of media into a single signal. For example, a television signal and an internet webcam signal can be combined into a single video signal so that users can view the integrated media on a single display device at the same time.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the preferred embodiments of the present invention, examples of which are illustrated in the accompanying drawings. Wherever possible, the same reference numbers are used in the drawings and the description to refer to the same or like parts.

Figure 2:
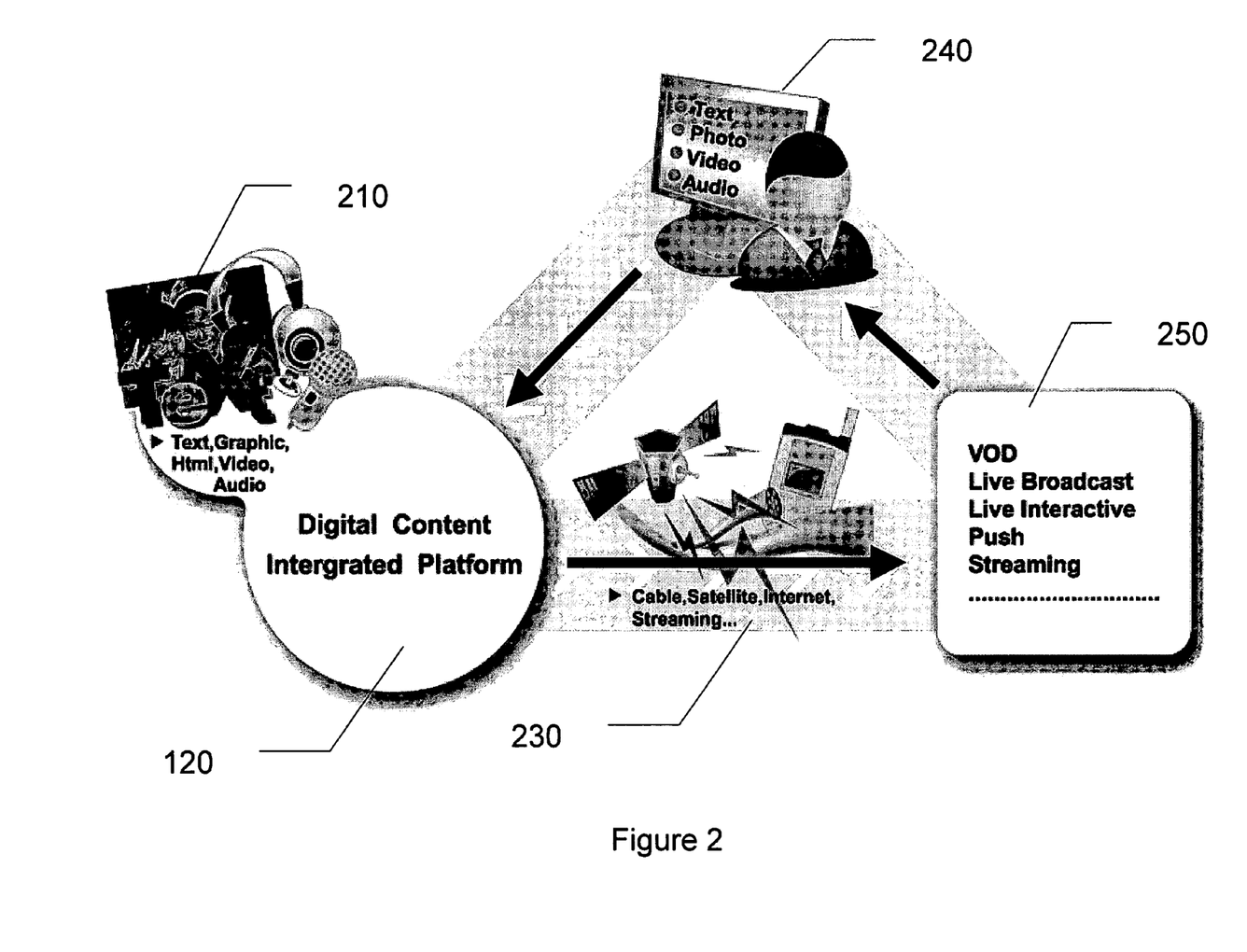
FIG. 2 is a block diagram showing an overview of the multimedia system with content integration platform according to an embodiment of the present invention.

Refer to FIG. 2, which is a block diagram showing an overview of the multimedia system with content integration platform according to an embodiment of the present invention. The content integration platform 120 is coupled via a link 230 to a user device 240. Media content in multiple formats and with various protocols 250 can be delivered to the user's device 240 from the media source 210. The link 230 can be implemented in various ways including cable, satellite, wireless, or internet. The media content comprises text, graphics, html, video, audio, web pages, television, etc. The protocols 250 comprise video on demand, live broadcast, live interactive, push, streaming, etc. The user's device 240 comprises, a television, computer, computer monitor, LED display, plasma display, cellular phone, etc.

In this way, the media source or provider can provide a variety of media content in a variety of formats to the content integration platform. The content integration platform converts or combines the various types of content into a variety of formats or protocols. Then the converted or integrated media is sent via a variety of links or transmission methods to a variety of user devices using a variety of protocols.

Additionally, the user is able to interact with the content and communicate with the content integration platform. This allows the users and media provider to interact with the media content via the content integration platform.

Figure 3:
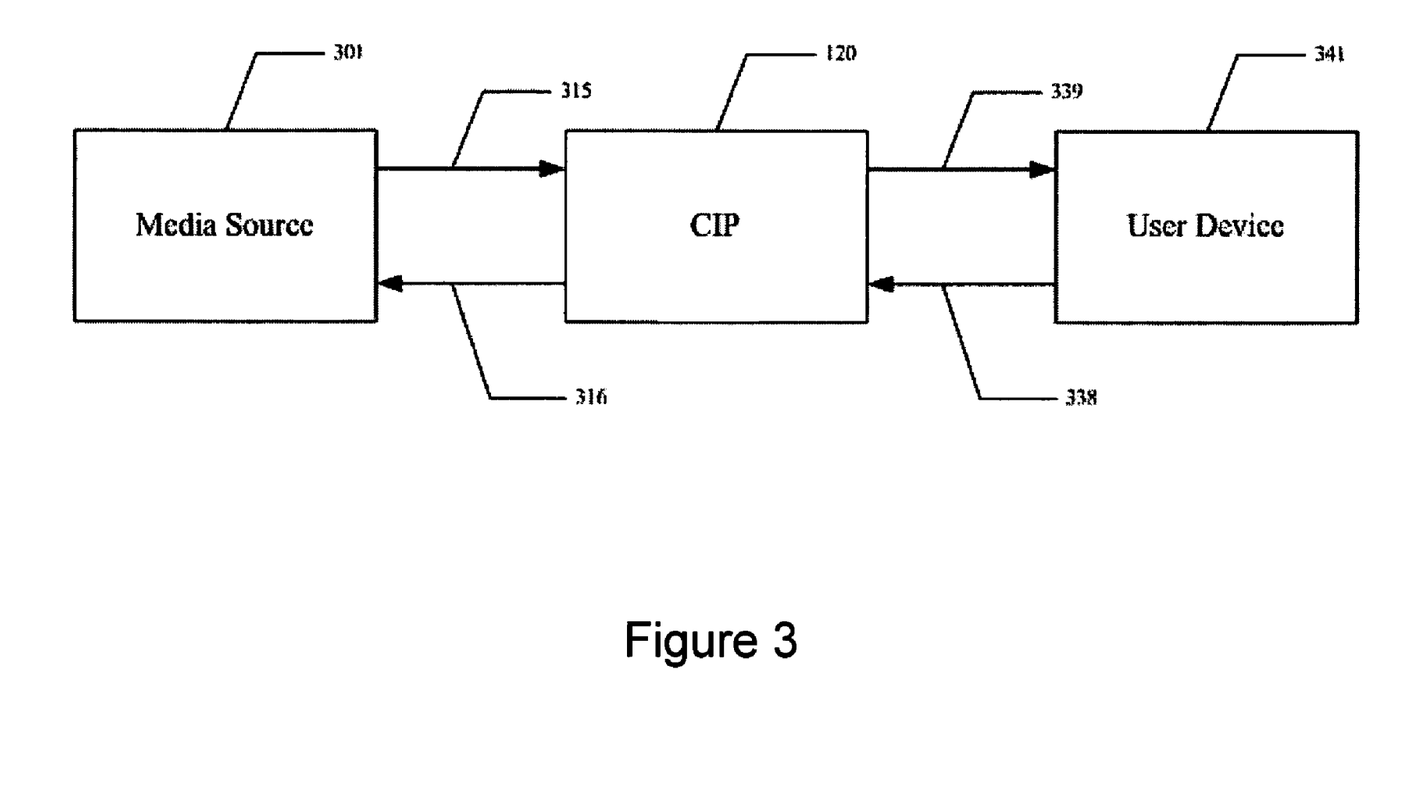
FIG. 3 is a block diagram illustrating a multimedia system with content integration platform according to an embodiment of the present invention.

Refer to FIG. 3, which is a block diagram illustrating a multimedia system with content integration platform according to an embodiment of the present invention. A media source 301 sends media content to the content integration platform 120 over a source link 315. The content integration platform 120 delivers the media content to a user device 341 via a user link 339. The user device 341 communicates with the content integration platform 120 over a user link 138, and the content integration platform 120 delivers the information from the user device 341 to the media source 301 over a source link 316. The links 315, 316, 338, 339 can be over physical wires or by electromagnetic communications or a combination thereof. The user links 339, 338 can be the same link or a separate link. The source links 315, 316 can be the same link or a separate link. The content integration platform 120 may be located remotely from either or both the media source 301 or the user device 341.

Figure 4:
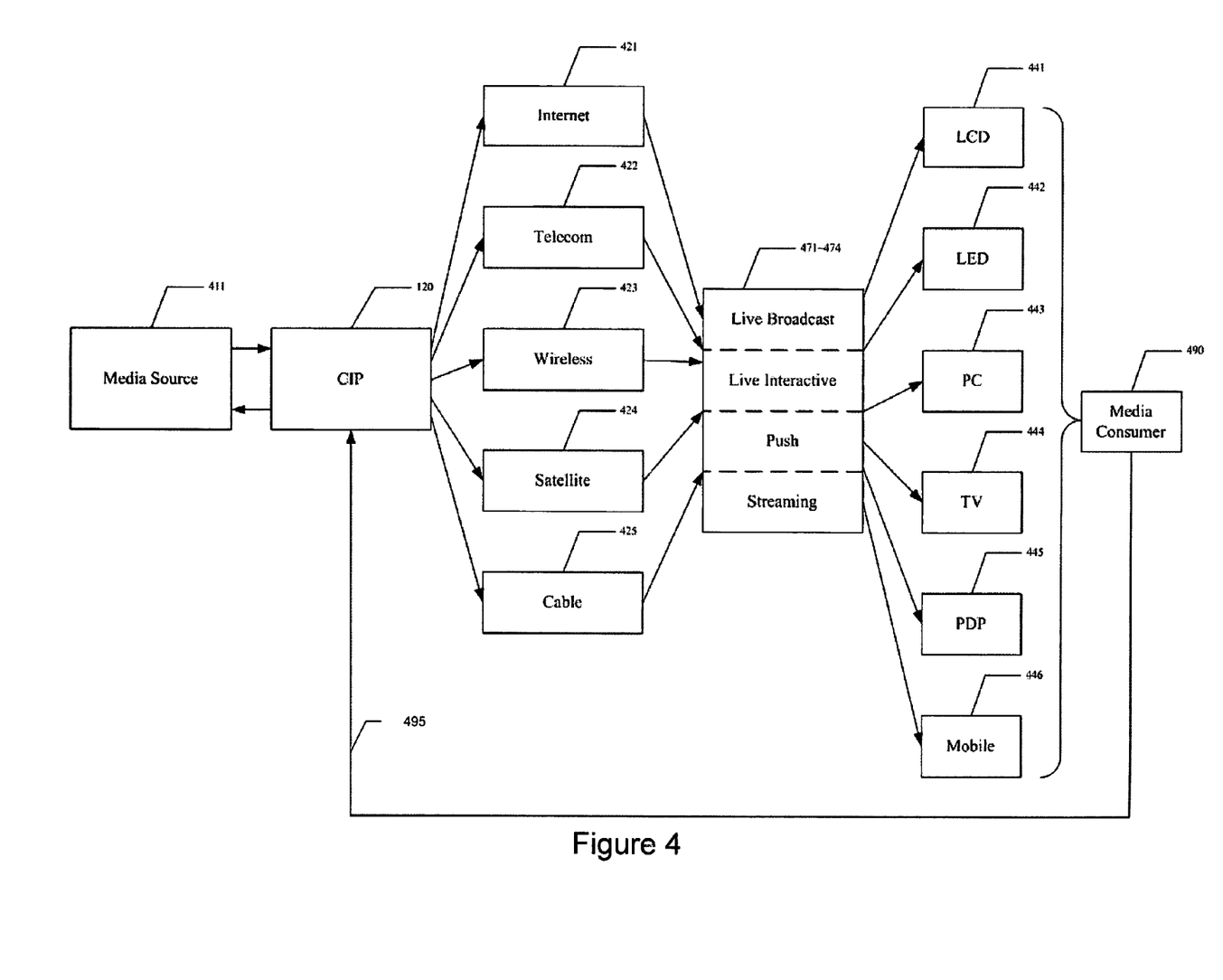
FIG. 4 is a block diagram showing inputs and outputs of a multimedia system with content integration platform according to an embodiment of the present invention.

Refer to FIG. 4, which is a block diagram showing inputs and outputs of a multimedia system with content integration platform according to an embodiment of the present invention. The media source or content provider 411 delivers media content of various types to the content integration platform 120. The content integration platform 120 utilizes communications links 421~425 with media methods 471~474 to deliver the media content to the output devices 441~446 for the media consumer 490. The media consumer 490 is then able to interact with the media content via$_{[ML1]}$ interaction link 495 with the content integration platform 120.

Figure 5:
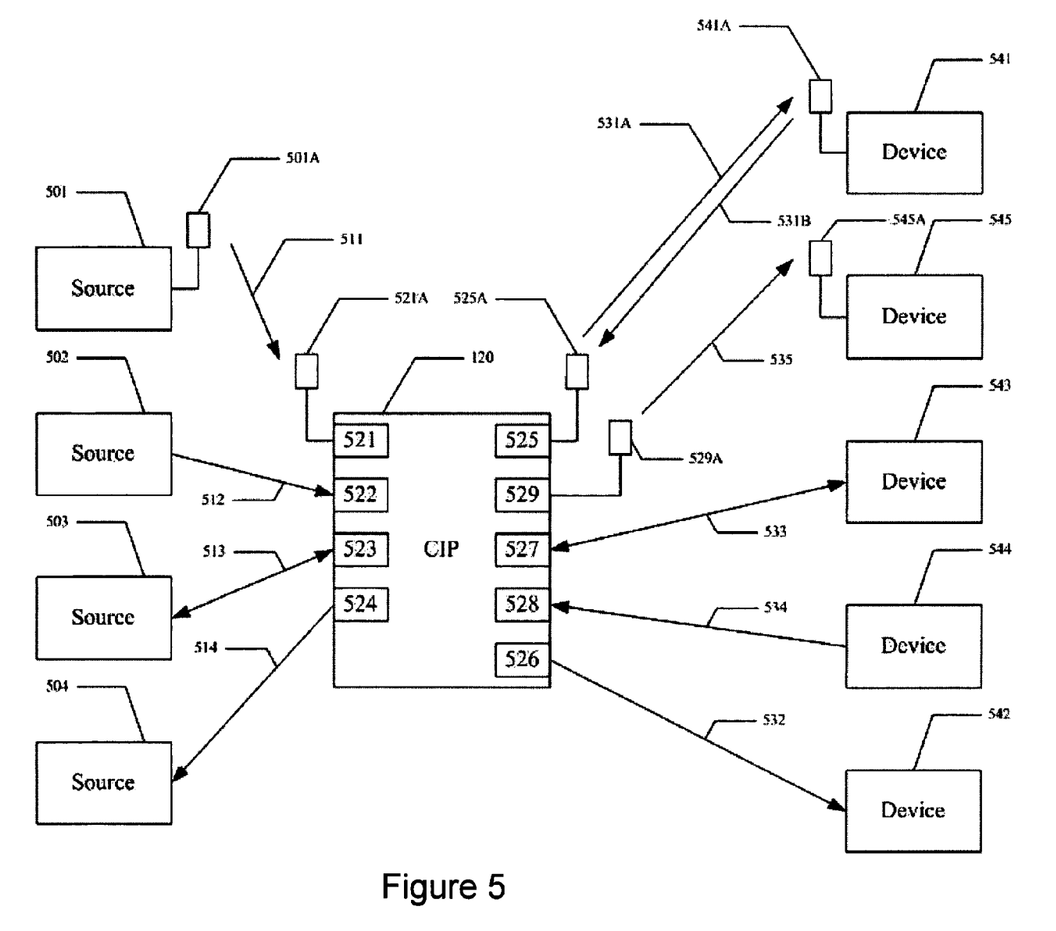
FIG. 5 is a block diagram illustrating components of a multimedia system with content integration platform according to an embodiment of the present invention.

Refer to FIG. 5, which is a block diagram illustrating components of a multimedia system with content integration platform according to an embodiment of the present invention. The multimedia system 500 comprises a plurality of media sources 501~504 which are linked to the content integration platform 120 by a variety of different means.

For example, media source 501 transmits an electromagnetic signal link 511 from an antenna 501A which is received by antenna 521A of the content integration platform 120. As an example, the media source 501 could be an AM/FM radio station transmitting a radio signal or a wireless telephone transmitting a wireless signal.

Media sources 502 and 504 are coupled to the content integration platform 120 by physical links 512 and 514 respectively, which are operating unidirectionally.

Media source 503 is coupled to the content integration platform 120 by a link 513 which operates bi-directionally. These links comprise a variety of means, such as coaxial cable, Ethernet, telephone line, USB, FireWire (1394), or other networking systems or methods. Electromagnetic signal links comprise a variety of means, such as satellite, fixed wireless, infrared, Bluetooth, WiFi, 802.11(b), 802.11(g), cellular telephone communications methods such as PHS, CDMA, and TDMA, AM radio, FM radio, and so forth. These sources are fed into the device 520 through a plurality of input connectors 521~524.

The content integration platform 120 selects among its inputs 521~524 and outputs the selected signal to one or more of its user connections 525~529. These user connections are coupled to various input, output, and input/output user devices 541~545 through a variety of means, both wired and wireless. For example, input/output user device 541 is linked bi-directionally to the device 120 by a radio link 531A, 531B, using antenna 541A to communicate with antenna 525A through user connector 525; this can be accomplished by Bluetooth, 802.11(b), 802.11(g), WiFi, WiMax, cellular, or other wireless communications standard. Output user device 545 is linked uni-directionally to the content integration platform 120 by a radio link 535 through user connection 529, using antenna 545A to communicate with antenna 529A; this can be accomplished by Bluetooth, 802.11(b), 802.11(g), WiFi, WiMax, WAP, cellular, or other wireless communications standard. Output user device 542, input/output user device 543, and input user device 544 are coupled to the content integration platform 120 through user connections 526, 527, 528 respectively, with such couplings as coaxial cable, USB, FireWire (IEEE-1394), serial cable, parallel cable, video cable, S-video, composite video, RGB video, Ethernet cable, token ring cable, phone line, or other wired couplings. Output user device 542 is connected uni-directionally to user connection 526 for output, input user device 544 is coupled uni-directionally to user connection 528 for input, and input/output user device 543 is coupled bi-directionally to user connection 527 for both input and output. Additionally, a wireless input user device (not shown) is coupled to device 120 via a wireless transmitter, using infrared, Bluetooth, or other short-range electromagnetic transmissions.

Figure 6:
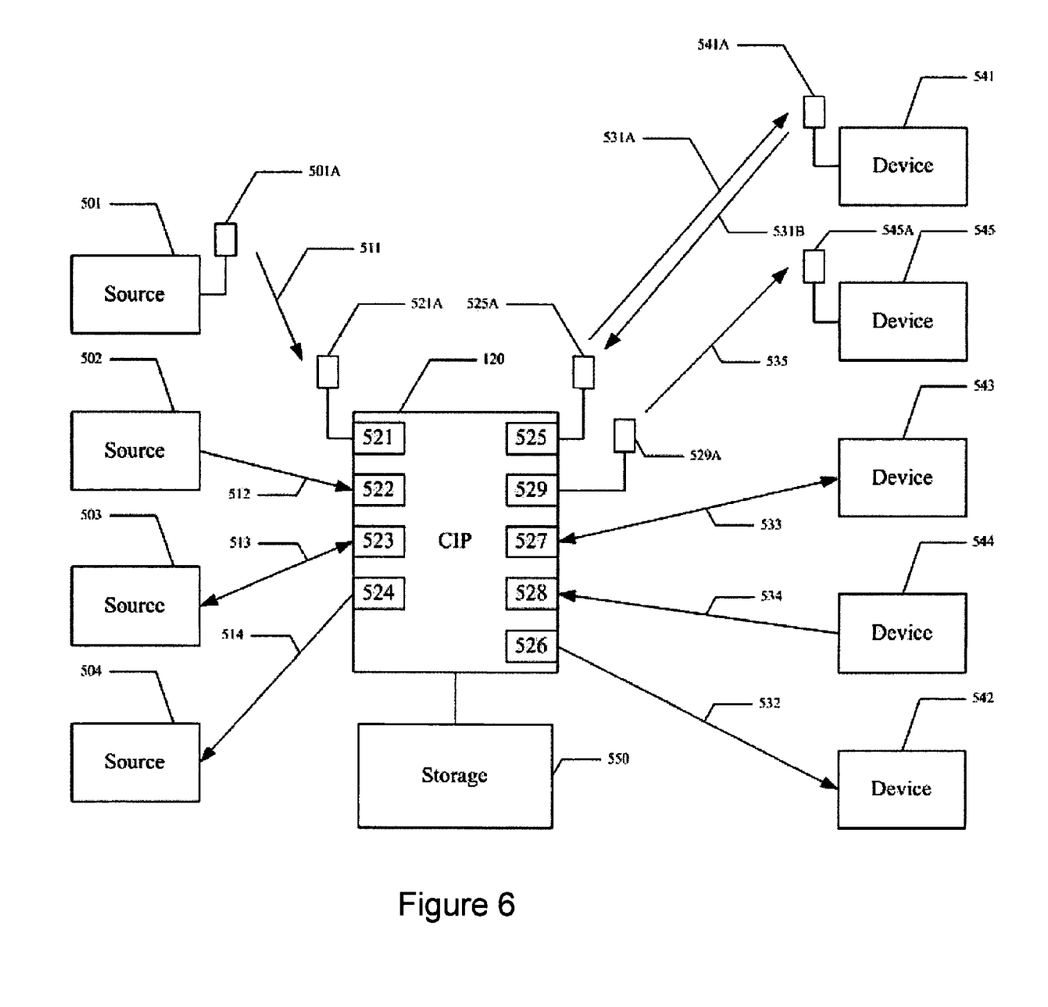
FIG. 6 is a block diagram illustrating components of a multimedia system with content integration platform according to an embodiment of the present invention.

Refer to FIG. 6, which is a block diagram illustrating components of a multimedia system with content integration platform according to an embodiment of the present invention. This embodiment is similar to that of FIG. 5, with the addition of a digital multimedia recorder 550 coupled to the content integration platform 120. The digital multimedia recorder comprises, for example, a media server. This allows the desired media content to be recorded and stored for access at a later time.

Figure 7A:
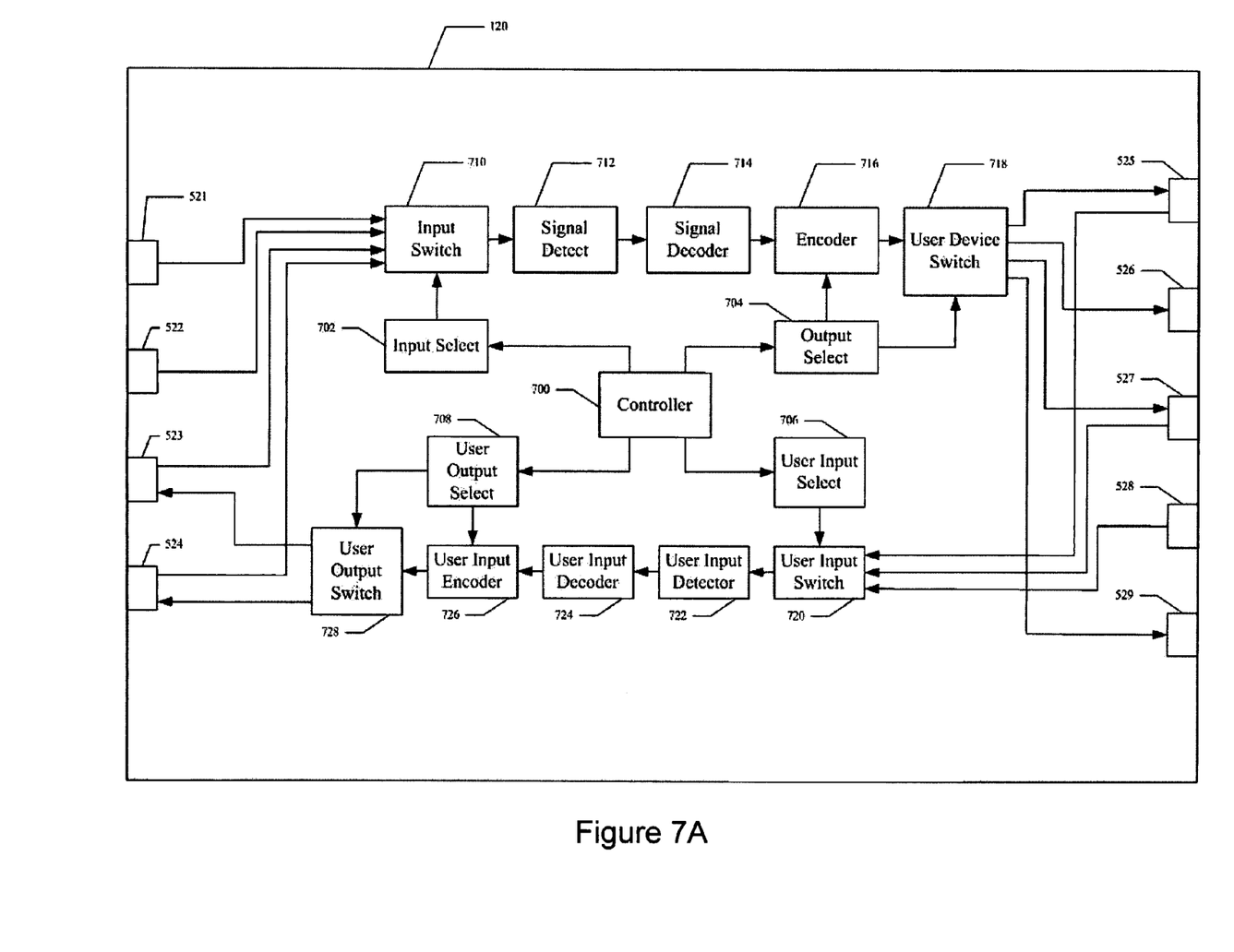
FIG. 7A is a block diagram illustrating audio and video encoding decoding components of a content integration platform according to an embodiment of the present invention.

Please refer to FIG. 7A, which is a block diagram illustrating audio and video encoding decoding components of a content integration platform according to an embodiment of the present invention. The content integration platform 120 receives signals from a plurality of media sources into the source switch 710 via inputs 521-524. These signals are selected with a selection device (not shown) such as a wireless remote (radio or infrared), user interface menu, software, or control panel button; this tells the controller 700 to set the input selector 702 to have the source switch 710 output the selected signal to the signal detector 712. The output destination for the selected signal is also selected, and the controller 700 sets this information in the output selector 704. The content integration platform 120 has been programmed with the capabilities of the available output devices. The signal detect unit 712 then detects the format of the input signal, such as AM radio, FM radio, or other analog audio format, NTSC video, PAL video, SECAM video, or other analog video format, RGB video, MPEG2 video, MPEG4 video, PCM audio, MP3 audio, MP4 audio, WAV audio, AIFF audio, AU audio, AAC audio, AVI video, RealMedia video, RealAudio, LiquidAudio, DIVX, CSS DVD, VCD, digital cable, or other digital audio or digital video format, TIFF, JPEG, GIF, PNG, or other digital image format, or HTML, XML, SGML, ASCII, or other textual format, or RSS or other push textual format, and passes the format information to the signal decoder 714 for decoding the input. The output of the signal decoder 714 is sent to the signal encoder 716 to be converted to an acceptable output format for the selected output device; the signal encoder uses the information from the output selector 704 to choose an appropriate output format. The signal encoder 716 then sends the output signal through the user device switch 718, which uses the signal from the output selector 704 to choose which output connection 525~529 to send the signal to. The output device may be a cellphone, cellphone video screen, computer, television, set-top box, or any other device capable of receiving an audio or video signal.

It should be noted that the output format may be a subset of the input format; for example, an audio/video signal such as a television broadcast may be the selected input, while a streaming audio format is chosen for output. This would, for example, allow a media consumer to listen to the audio of a favorite television show when the media consumer was unable to watch the show, perhaps while driving and using an audio-only cellphone as the output device.

The content integration platform 120 also allows the user to communicate with the media sources or interact with the media content. The output connections can receive input and forward the input data to a media source over an appropriate connection. The input can be a video stream, such as from a webcam, digital video camera, or analog video camera, an audio stream, such as analog audio from a microphone or digital PCM audio from a computer, an audio-video stream, or a button press or remote navigation command from a wireless remote control. When sent, the input channel is selected by the user input switch 720, as instructed by the controller 700 via the user input selector 706, the selected channel is passed to the user input detector 722 to determine the format, and the input and format information are passed to the user input decoder 724. The user input decoder 724 then passes the decoded signal to the user input encoder 726, which converts the input signal to an appropriate format based on the user output selector 708 as controlled by the controller 700. The encoded data is then passed to the user output switch 728, which uses the information from the user output selector 708 to determine which input channel to send the user output signal to. The user input feature can be used for example, for video conferencing, such as a business meeting or video dating, or for voice over EP (VoIP) telephony, or for choosing an option on a television news station's nightly opinion poll, or for selecting pizza toppings for a pizza from a delivery service order page.

In a preferred embodiment, the signal from the media source is converted to a video stream by a real-time or near-real-time decoder-encoder when the output device is capable of receiving such a signal. The content integration platform 120 may also convert from one protocol to another in order to meet the requirements of its input sources and output devices; for example, it may need to convert from a packetized TCP/IP or UDP/IP video stream to NTSC video; or it may convert 3G cellular signalling to UDP/IP.

Figure 7B:
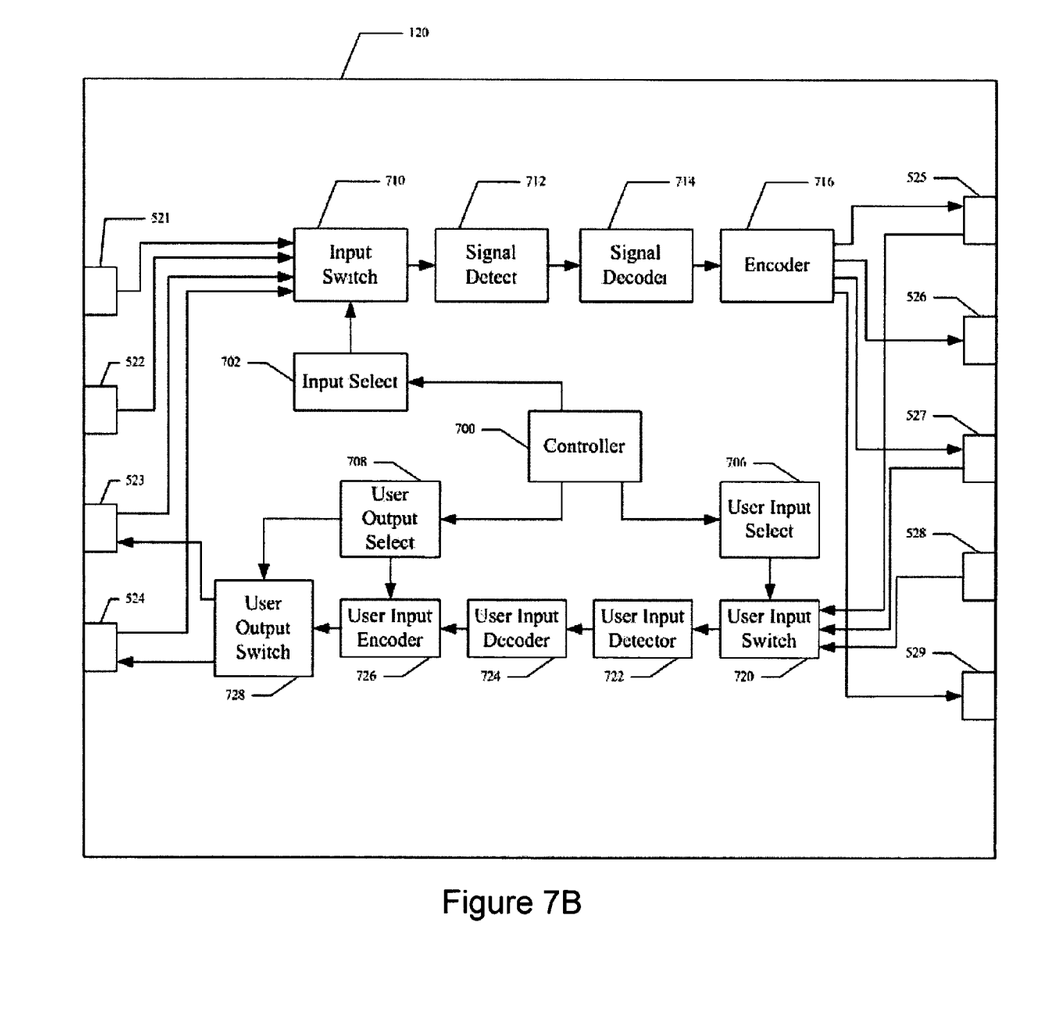
FIG. 7B is a block diagram illustrating audio and video encoding decoding components of a content integration platform according to an embodiment of the present invention.

Refer to FIG. 7B, which is a block diagram illustrating audio and video encoding decoding components of a content integration platform according to an embodiment of the present invention.

In the embodiment illustrated in FIG. 7B, the media content is multicast to all available user devices via the appropriate protocol and format. The media source is encoded by encoder 716 and output to connections 525, 526, 527, 529. This allows multiple users of various devices to receive the content.

For example, if the media source is a satellite TV broadcast, the encoder will encode the broadcast so that it can be heard or viewed by users with devices such as computers, televisions, radios, cellular phones, etc. This allows a single media source to provide content in multiple formats and protocols by utilizing the content integration platform of the present invention.

Figure 7C:
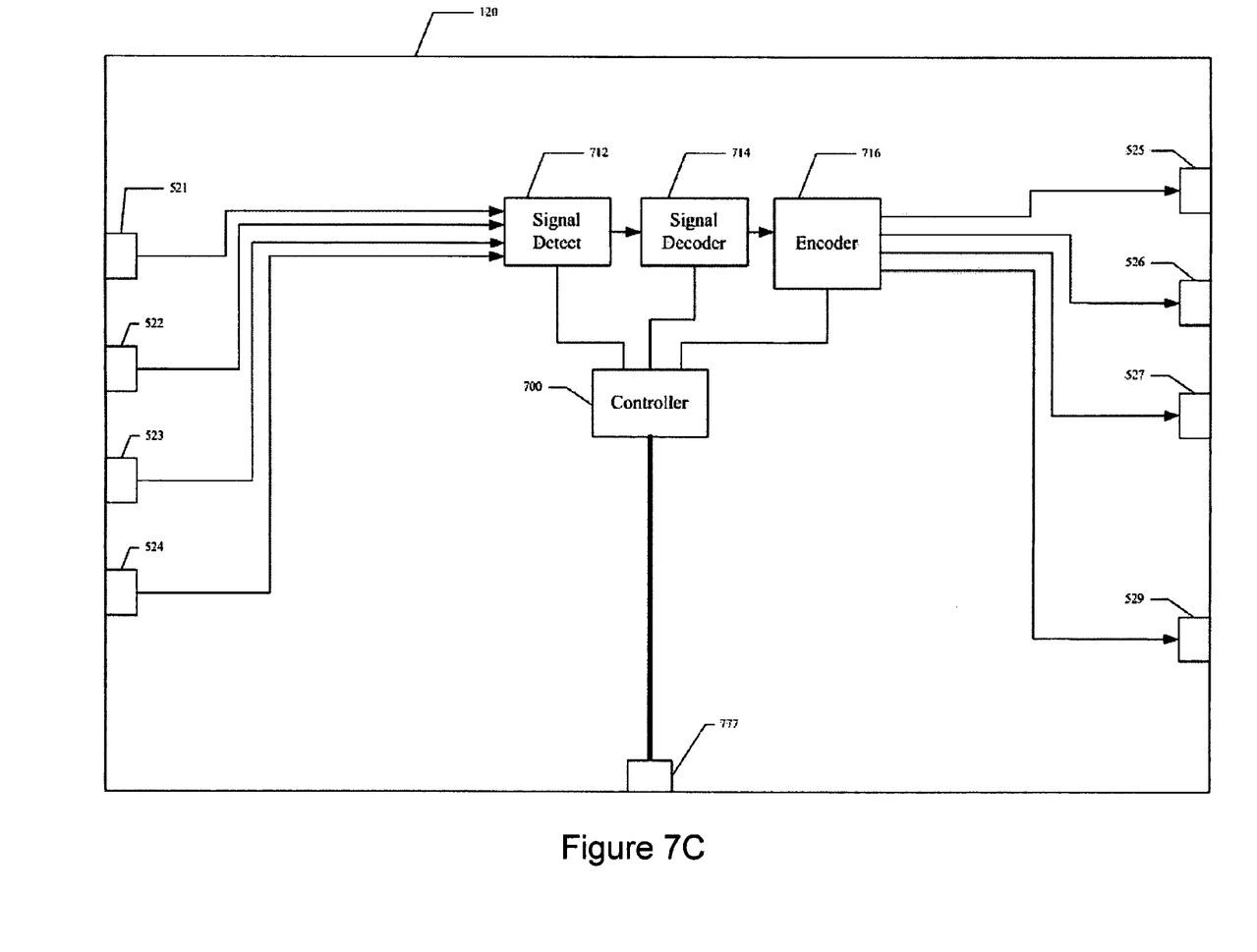
FIG. 7C is a block diagram illustrating audio and video encoding decoding components of a content integration platform according to an embodiment of the present invention.

Refer to FIG. 7C, which is a block diagram illustrating audio and video encoding decoding components of a content integration platform according to an embodiment of the present invention.

In the embodiment illustrated in FIG. 7C, the user feedback or input is eliminated or is accomplished externally to the content integration platform 120. This allows for a simplified device wherein the media source is converted into a plurality of formats and protocols and delivered to the user devices.

Obviously, the number or type of inputs and outputs and protocols handled by the content integration platform can be varied. For example, only an internet output connection can be supplied so that any media source is converted and transmitted to user devices via the internet.

Additionally, a plurality of one type of protocol, input, or output can be arranged. For example a plurality of satellite TV inputs can be connected to the content integration platform.

Figure 8A:
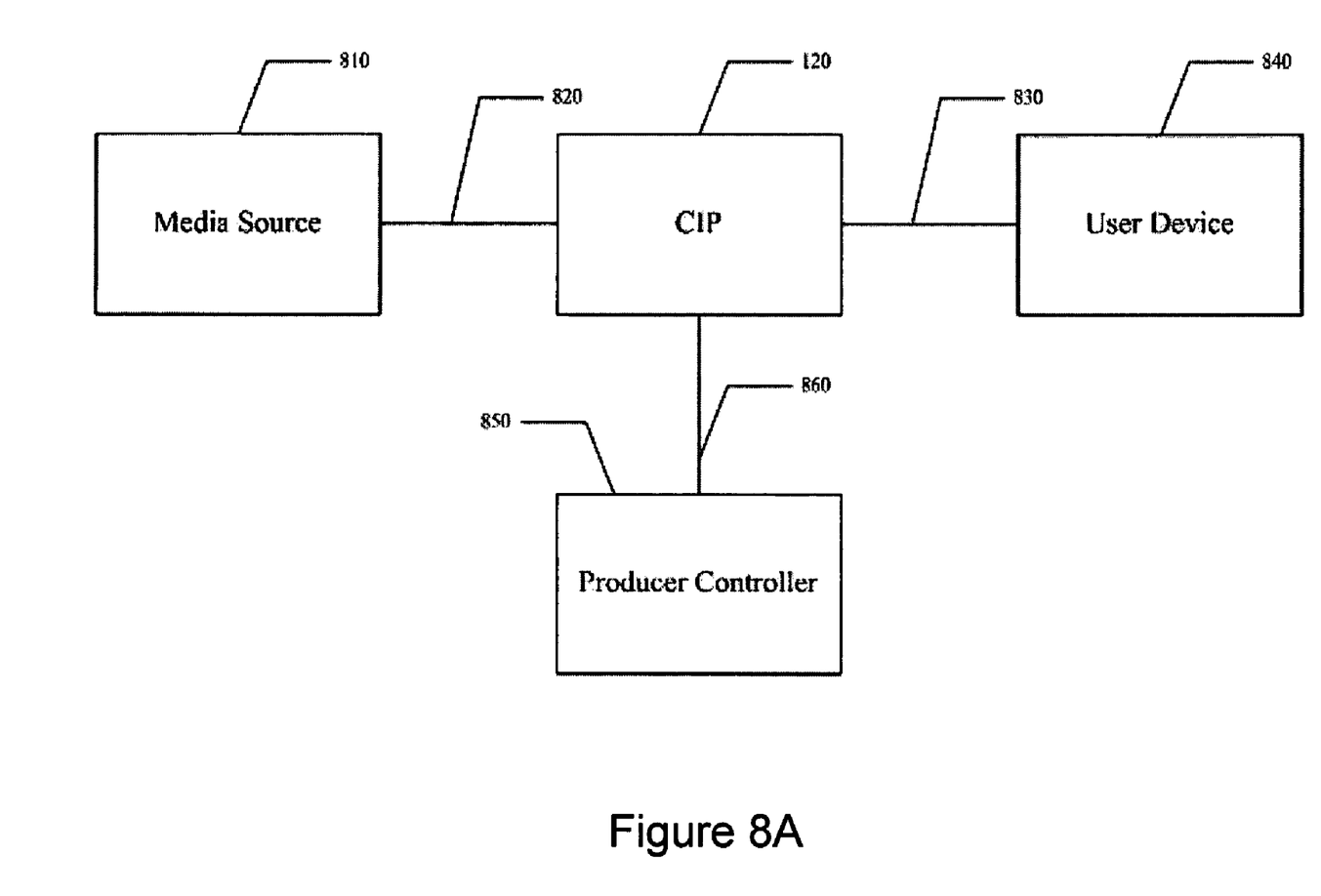
FIG. 8A is a block diagram illustrating a multimedia system with content integration platform according to an embodiment of the present invention.

Refer to FIG. 8A, which is a block diagram illustrating a multimedia system with content integration platform according to an embodiment of the present invention.

A further advantage of the present invention is that the various media content or signals can be integrated together. For example, if the media source 810 provides a satellite TV signal to the content integration platform 120 via a source link 820, and the user device 840 is a computer with webcam, the user's video can be sent to the content integration platform via user link 830. These two media signals can then be integrated into a single signal and displayed together so that users can see both signals at the same time in the same display window.

Furthermore, a plurality of media sources can supply a number of various types of media and a plurality of user media signals can be integrated with the media sources into a single audio/video signal.

A producer controller 850 can perform real-time or near real-time production on the signals. For example, the producer controller 850 can assign or arrange the layout of the various media components or signals in the display or select input from the various media sources or user devices.

For example, if the media source 810 is a television signal and the user device or devices 840 are a plurality of computers with web cameras, the video, audio, or audio and video signals from the web cameras can be integrated with the television signal so that users can view the combined signal. This combined signal can be encoded into a variety of formats and protocols so that users using different user devices can hear or view the integrated content.

Figure 8B:
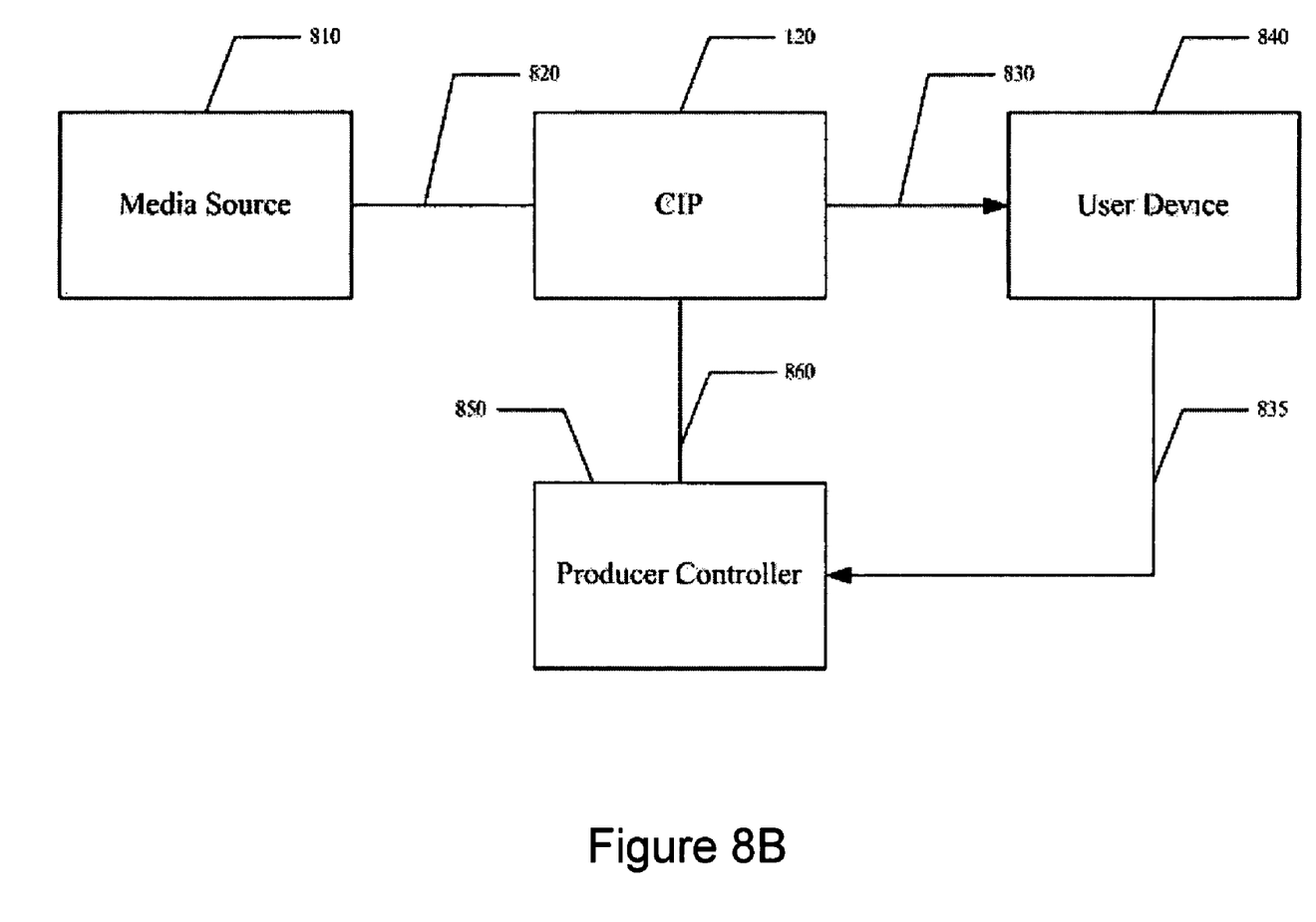
FIG. 8B is a block diagram illustrating a multimedia system with content integration platform according to an embodiment of the present invention.

Refer to FIG. 8B, which is a block diagram illustrating a multimedia system with content integration platform according to an embodiment of the present invention.

In the embodiment illustrated in FIG. 8B, the user devices receive the media via user link 830 and feedback, interact, or supply user content to the producer controller 850 via user link 835.

This embodiment allows the user to utilize two different devices to interact with the media. For example, the user can view the media on a television and communicate with the producer controller via a cellular phone.

Figure 9:
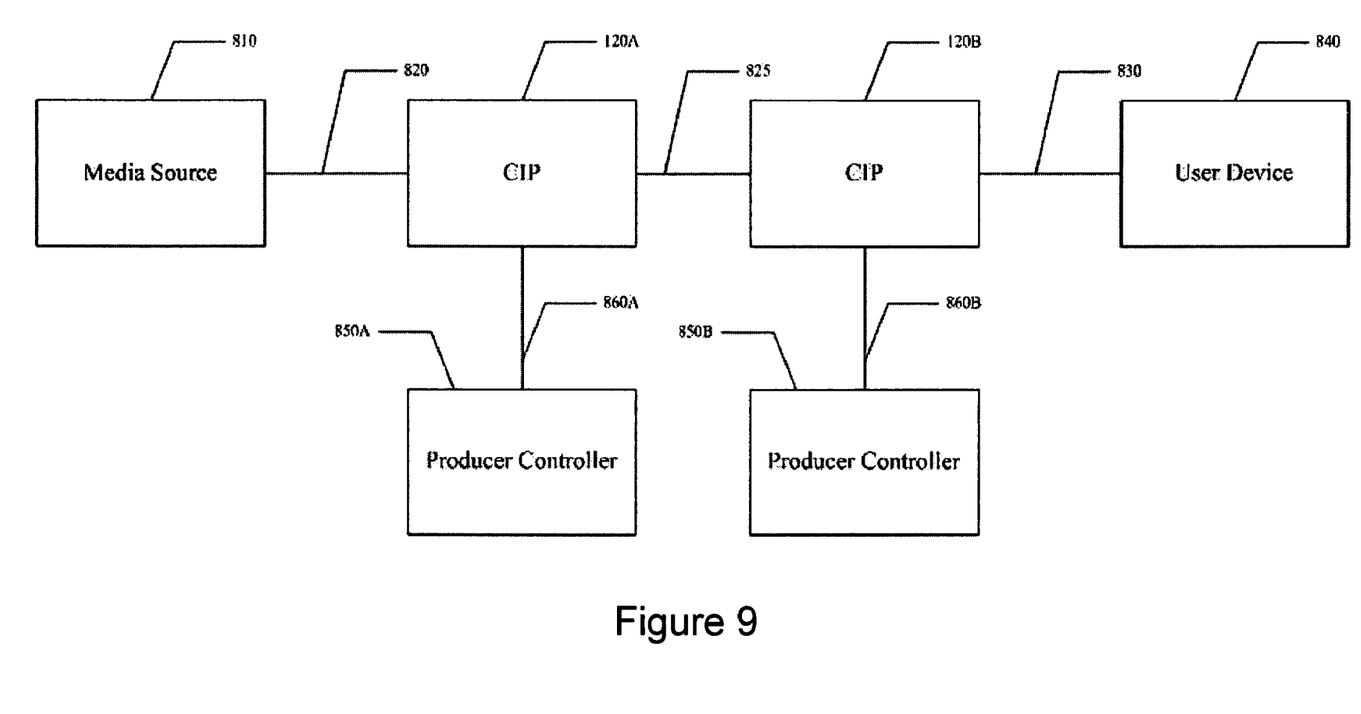
FIG. 9 is a block diagram illustrating a multimedia system with a plurality of content integration platforms according to an embodiment of the present invention.

Refer to FIG. 9, which is a block diagram illustrating a multimedia system with a plurality of content integration platforms according to an embodiment of the present invention.

As shown in FIG. 9, more than one content integration platform can be utilized to add further flexibility and advantages. A first media source 810 supplies media content to a first content integration platform 120A via link 820. The first content integration platform encodes, decodes, or converts the media content and sends it to a second content integration platform 120B via link 825. The second content integration platform 120B encodes, decodes, or converts the media content and delivers it to the user device 840 via link 830.

A first producer controller 850A is connected to the first content integration platform 120A via link 860A. A second producer controller 850B is connected to the second content integration platform 120B via link 860B. It should be noted that a single producer controller can be utilized instead of two.

An advantage to the embodiment illustrated in FIG. 9 is that a more inexpensive or more convenient link can be utilized between the two content integration platforms. Additionally, by utilizing two content integration platforms, the media source can provide media content internationally with the same effort as required locally.

For example, a cable television station can deliver their broadcasts to the first content integration platform. The media content can then be decoded, encoded, or converted and sent across the internet to the second content integration platform. The second content integration platform then decodes, encodes, or converts the media content and delivers the media content to the user device. Furthermore, the second integration platform can convert the media content back into the original format, in this example cable television. This allows a television user in one location to view cable television broadcast from a second location, for example internationally.

As another example, a cellular phone user in one country can make a call which is transferred to their local service provider. The wireless signal is converted by the content integration platform and sent over the internet to a second content integration platform in another country. The second content integration platform converts the signal back into a wireless signal and sends it to the receiving party in another country. This allows the cellular phone user to call internationally for close to local rates.

A further advantage of the multimedia system with content integration platform and format and protocol converter is that by allowing access to a wider variety of content, the media consumer can purchase content at any time. Rather than having to subscribe to a channel permanently, the media consumer can purchase a single program from the channel, or order special extra features. The media consumer can receive the content on any convenient device, such as a cellphone, computer, television, or stereo system. Additionally, the multimedia system can acquire media content from remote sources for media content that is delivered on systems for which the user does not have equipment. For example, media content that is delivered via satellite network can be received remotely, transferred to the content integration platform and converted to a format that the user can view on an available device. Such content can be ordered and purchased on demand.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A content integration system comprising:
   at least one media source link member;
   at least one user device link member;
   a controller operable to control and connected to the at least one media source link member and the at least one user device link member;
   a decoder for decoding data of a plurality of first formats from a plurality of media sources; and
   an encoder for adaptively encoding data decoded by the decoder to a second format compatible with a selected one of a plurality of user devices, wherein the content integration system converts formats of a plurality of media sources into appropriate formats for the user devices, wherein the content integration system integrates signals from the media sources with signals from a user device to form a single signal.

2. The content integration system of claim 1, further comprising:
   a first switch for selecting among the media source link members; and
   a second switch for selecting among the user device link members.

3. The content integration system of claim 1, further comprising:
   a memory for storing settings of the device; and
   a temporary memory for storing intermediate data.

4. The content integration system of claim 1, wherein the decoder and encoder comprise updatable software.

5. The content integration system of claim 1 further comprising:
   a communications controller for managing and configuring communications protocols.

6. The content integration system of claim 5, wherein the communications protocols comprise at least one protocol from the group TCP/IP, UDP/IP, 3G wireless, Bluetooth, WiFi, NTSC, PAL, SECAM, WAP, and HTTP.

7. The content integration system of claim 1, wherein the format comprises AM radio, FM radio, or other analog audio format, NTSC video, PAL video, SECAM video, or other analog video format, RGB video, MPEG2 video, MPEG4 video, PCM audio, MP3 audio, MP4 audio, WAV audio, AIFF audio, AU audio, AAC audio, AVI video, RealMedia video, RealAudio, LiquidAudio, DIVX, CSS DVD, VCD, digital cable, or other digital audio or digital video format, TIFF, JPEG, GIF, PNG, or other digital image format, or HTML, XML, SGML, ASCII, or other textual format, or RSS or other push textual format.

8. A content integration system with format and protocol conversion comprising:
 a first plurality of communication link members for connecting to external media sources;
 a second plurality of communication link members for connecting to external user devices;
 a central processing unit operable to control the devices;
 a decoder for decoding data of a plurality of first formats from a plurality of external media sources; and
 a multimedia encoder for adaptively encoding data decoded by the decoder to a second format compatible with a selected one of a plurality of external user devices, wherein the content integration system converts formats of a plurality of external media sources into appropriate formats for the external user devices, wherein the content integration system integrates signals from the media sources with signals from a user device to form a single signal.

9. The content integration system with format and protocol conversion of claim 8, wherein the format comprises AM radio, FM radio, or other analog audio format, NTSC video, PAL video, SECAM video, or other analog video format, RGB video, MPEG2 video, MPEG4 video, PCM audio, MP3 audio, MP4 audio, WAV audio, AIFF audio, AU audio, AAC audio, AVI video, RealMedia video, RealAudio, LiquidAudio, DIVX, CSS DVD, VCD, digital cable, or other digital audio or digital video format, TIFF, JPEG, GIF, PNG, or other digital image format, or HTML, XML, SGML, ASCII, or other textual format, or RSS or other push textual format.

10. The content integration system with format and protocol conversion of claim 9, further comprising:
 a first switch for selecting among the first plurality of communication link members; and
 a second switch for selecting among the second plurality of communication link members.

11. The content integration system with format and protocol conversion of claim 9, further comprising:
 a memory for storing settings of the device; and
 a temporary memory for storing intermediate data.

12. The content integration system with format and protocol conversion of claim 9, wherein the decoder and encoder comprise updatable software.

13. The content integration system with format and protocol conversion of claim 9 further comprising:
 a communications controller for managing and configuring communications protocols.

14. The content integration system with format and protocol conversion of claim 13, wherein the communications protocols comprise at least one protocol from the group TCP/IP, UDP/IP, 3G wireless, Bluetooth, WiFi, NTSC, PAL, SECAM, WAP, and HTTP.

15. A content integration system with format and protocol conversion comprising:
 a first plurality of communication link members for connecting to external media sources;
 a second plurality of communication link members for connecting to external user devices;
 a first switch operable to select among the first plurality of communication link members;
 a second switch operable to select among the second plurality of communication link members;
 a central processing unit operable to control operations of the devices;
 a memory for storing settings of the devices;
 a temporary memory for storing intermediate data;
 an updatable software multimedia decoder for decoding data of a plurality of first formats from a plurality of external media sources; and
 a multimedia encoder for adaptively encoding data decoded by the decoder to a second format compatible with a selected one of a plurality of external user devices, wherein the content integration system platform integrates signals from the media sources with signals from the user devices to form a single signal.

16. The content integration system with format and protocol conversion of claim 15, further comprising:
 a communications controller for managing and configuring communications protocols.

17. The content integration system with format and protocol conversion of claim 16, wherein the communications protocols comprise at least one protocol from the group TCP/IP, UDP/IP, 3G wireless, Bluetooth, WiFi, NTSC, PAL, SECAM, WAP, and HTTP.

18. The content integration system with format and protocol conversion of claim 15, wherein the format comprises AM radio, FM radio, or other analog audio format, NTSC video, PAL video, SECAM video, or other analog video format, RGB video, MPEG2 video, MPEG4 video, PCM audio, MP3 audio, MP4 audio, WAV audio, AIFF audio, AU audio, AAC audio, AVI video, RealMedia video, RealAudio, LiquidAudio, DIVX, CSS DVD, VCD, digital cable, or other digital audio or digital video format, TIFF, JPEG, GIF, PNG, or other digital image format, or HTML, XML, SGML, ASCII, or other textual format, or RSS or other push textual format.

* * * * *